Patented Oct. 23, 1934

1,977,936

UNITED STATES PATENT OFFICE 1,977,936

WATER-INSOLUBLE DISAZO-DYESTUFFS

Heinz Eichwede, Frankfort-on-the-Main-Hochst, Germany, assignor to General Aniline Works, Inc., New York, N. Y., a corporation of Delaware No Drawing. Application December 21, 1933, Serial No. 703,489. In Germany December 23, 1932

5 Claims. (Cl. 260—78)

The present invention relates to water-insoluble disazo-dyestuffs; more particularly it relates to dyestuffs of the following general formula:

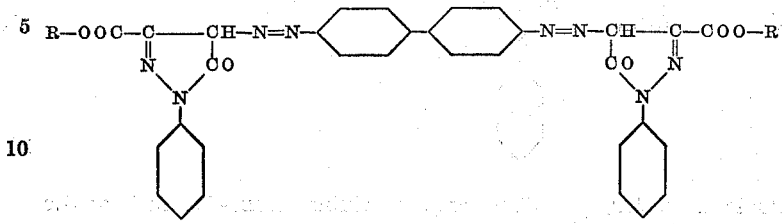

wherein the diphenyl radical and the phenyl radical of the pyrazolone may be substituted by halogen, alkyl or alkoxy groups and R stands for methyl or ethyl.

I have found that valuable dyestuffs of yellowish-red to violet shades are obtainable by tetrazotizing 4.4'-diamino-diphenyl or its derivatives, substituted by halogen, alkyl or alkoxy groups, and coupling it with a 1-phenyl-5-pyrazolone-3-carboxylic acid-alkyl-ester, the phenyl radical of which may be substituted by halogen, alkyl or alkoxy groups. The dyestuffs, thus obtained, are distinguished by good fastness properties. In view of their insolubility in oils, they may be used on an industrial scale in the manufacture of lakes for various purposes. Furthermore, the new dyestuffs are practically insoluble in natural rubber or in synthetic products having properties similar to those of natural rubber which renders them especially suitable also for being used in the rubber dyeing industry.

The following examples serve to illustrate the invention but they are not intended to limit it thereto; the parts are by weight:

(1) 18.4 parts of 4,4'-diaminodiphenyl are tetrazotized in hydrochloric acid solution with 13.8 parts of sodium nitrite. The tetrazo solution obtained is run into a solution of the sodium salt of 48 parts of 1-phenyl-5-pyrazolone-3-carboxylic acid-ethyl-ester to which there has been added such a quantity of an acid binding agent, such as sodium carbonate, chalk or magnesium oxide, as is sufficient to render the reaction, when the coupling is finished, feebly alkaline or neutral. Any excess of chalk or magnesium oxide, which might be present, is removed by stirring the reaction mixture with dilute acids. The dyestuff formed is filtered by suction, washed well and dried, advantageously at a moderate temperature. It represents a red powder and corresponds to the following formula:

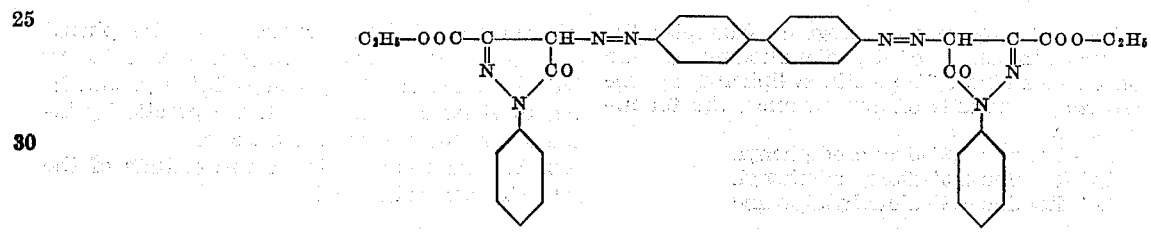

The dyestuff is practically insoluble in water, organic solvents, in oils and rubber articles.

By using, instead of 1-phenyl-5-pyrazolone-3-carboxylic acid-ethyl-ester, for instance, 1-phenyl-5-pyrazolone-3-carboxylic acid-methyl-ester, 1-(4'-methylphenyl)-5-pyrazolone-3-carboxylic acid-ethyl-ester, 1-(2'5'-dichlorophenyl)-5-pyrazolone-3-carboxylic acid-ethyl-ester, 1-(2'-chloro-6'-methylphenyl)-5-pyrazolone-3-carboxylic acid-ethyl-ester, 1-(2'-chlorophenyl)-5-pyrazolone-3-carboxylic acid-ethyl-ester, 1-(4'-bromophenyl)-5-pyrazolone-3-carboxylic acid-ethyl ester, there are obtained dyestuffs of similar shades and properties.

(2) 24.4 parts of 4,4'-diamino-3,3'-dimethoxydiphenyl are tetrazotized in the same manner as that described in Example 1. The tetrazo solution obtained is run into a solution of the sodium salt of 48 parts of 1-phenyl-5-pyrazolone-3-carboxylic acid-ethyl-ester and such a quantity of chalk is added as is sufficient to prevent the coupling solution from becoming acid. When the coupling is finished, any excess of chalk is removed by stirring the reaction mixture with dilute hydrochloric acid; the dyestuff is filtered by suction, washed well and dried at a temperature of about 50° C. It represents a violet-red powder and possesses the following constitution:

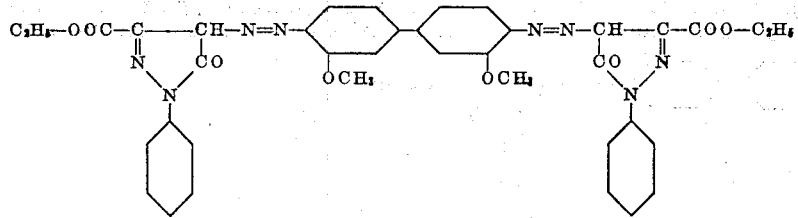

The dyestuff is practically insoluble in water, organic solvents, in oils and rubber articles.

By replacing in the foregoing examples the tetrazo-compounds of 4,4'-diaminodiphenyl and of 4,4'-diamino-3,3'-dimethoxydiphenyl by the tetrazo compounds of, for instance, the following bases:
4,4'-diamino-3,3'-dichlorodiphenyl,
4,4'-diamino-3,3'-dibromodiphenyl,
4,4'-diamino-3,3'-dimethyldiphenyl,
4,4' - diamino - 2,2' - dichloro-3,3'-dimethyldiphenyl,
4,4' - diamino-2,2'-dichloro-5,5'-dimethoxydiphenyl,
4,4' - diamino-3,3'-dichloro-2,2'-dimethoxydiphenyl,
4,4' - diamino - 6,6' - dichloro-3,3'-diethoxydiphenyl
or by other 4,4'-diaminodiphenyls which are substituted by halogen, alkyl or alkoxy groups, dyestuffs of similar properties are obtained.

I claim:

1. The water-insoluble disazo-dyestuffs of the following general formula:

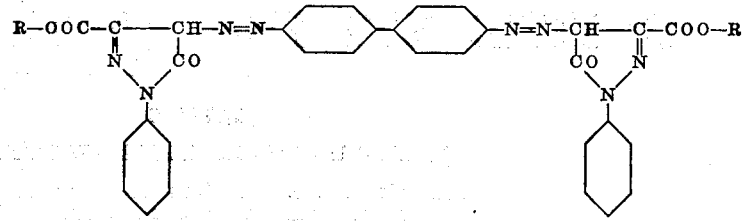

wherein the diphenyl radical and the phenyl radical of the pyrazolone may be substituted by halogen, alkyl or alkoxy groups and R stands for methyl or ethyl, being yellowish-red to violet dyestuffs which are practically insoluble in oils and rubber articles.

2. The water-insoluble disazo-dyestuffs of the following general formula:

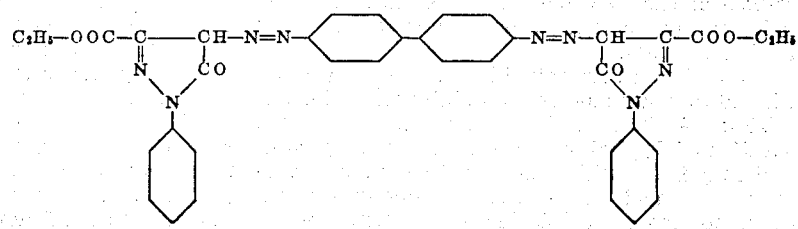

wherein the diphenyl radical and the phenyl radical of the pyrazolone may be substituted by halogen, alkyl or alkoxy groups, being yellowish-red to violet dyestuffs which are practically insoluble in oils and rubber articles.

3. The water-insoluble disazo-dyestuffs of the following general formula:

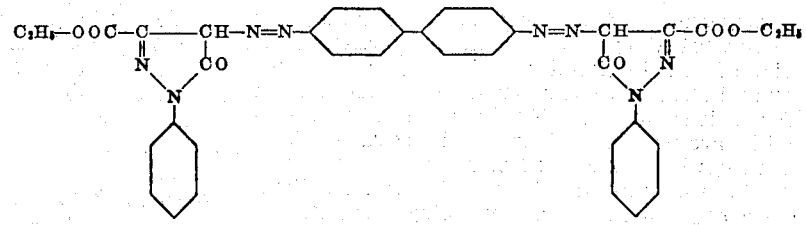

wherein the diphenyl radical and the phenyl radical of the pyrazolone may be substituted by chlorine, methyl or methoxy groups, being yellowish-red to violet dyestuffs which are practically insoluble in oils and rubber articles.

4. The water-insoluble disazo-dyestuff of the following formula:
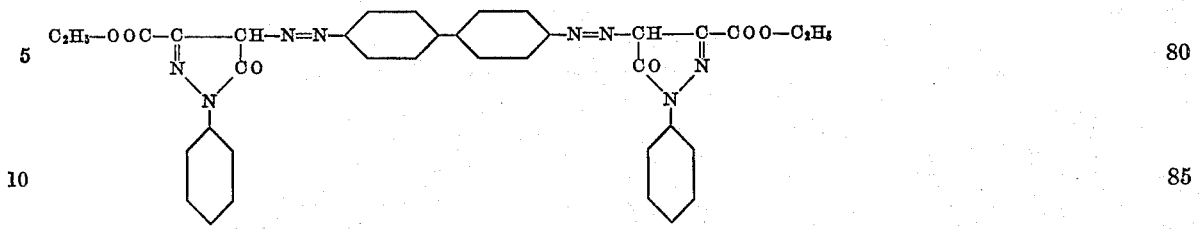
being a red dyestuff which is practically insoluble in oils and rubber articles.
5. The water-insoluble disazo-dyestuff of the following formula:
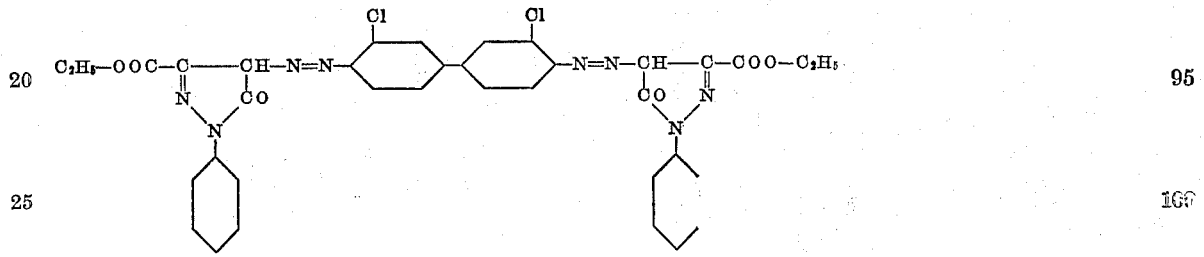
being a red dyestuff which is practically insoluble in oils and rubber articles.
HEINZ EICHWEDE.